United States Patent [19]

Schulze

[11] 4,351,150
[45] Sep. 28, 1982

[54] AUXILIARY AIR SYSTEM FOR GAS TURBINE ENGINE

[75] Inventor: Wallace M. Schulze, West Chester, Ohio

[73] Assignee: General Electric Company, Cincinnati, Ohio

[21] Appl. No.: 124,184

[22] Filed: Feb. 25, 1980

[51] Int. Cl.³ .................. F02K 3/04; F02C 6/06; F02C 7/20

[52] U.S. Cl. .................. 60/226 R; 60/39.07; 60/39.32; 60/39.83; 60/266; 60/726

[58] Field of Search .................. 60/266, 39.83, 39.07, 60/726, 226 R, 39.32; 361/384

[56] References Cited

U.S. PATENT DOCUMENTS

| | | | |
|---|---|---|---|
| 2,625,009 | 1/1953 | Leggett | 60/39.07 |
| 2,652,216 | 9/1953 | Hoffman | 60/39.83 |
| 2,717,489 | 9/1955 | Hasbrouck | 60/39.83 |
| 2,970,437 | 2/1961 | Anderson | 60/39.83 |
| 3,833,837 | 9/1974 | West | 361/384 |
| 4,182,119 | 1/1980 | Hurley | 60/226 R |

FOREIGN PATENT DOCUMENTS 907562 10/1962 United Kingdom .
1036409 7/1966 United Kingdom .
1317992 5/1973 United Kingdom .

Primary Examiner—Douglas Hart
Attorney, Agent, or Firm—Derek P. Lawrence

[57] ABSTRACT

An auxiliary air system contained within the nacelle of a gas turbine engine having the functions of cooling engine components and measuring air inlet temperature. The system comprises an air ducting pipe, temperature sensors extending into the pipe, a structure to be cooled, such as an electronics module, preferably with a heat transfer chamber, an air flow inducer, and, if desired, means for directing air onto other engine components.

4 Claims, 5 Drawing Figures

AUXILIARY AIR SYSTEM FOR GAS TURBINE ENGINE

BACKGROUND OF THE INVENTION

1. Field of the Invention

This invention relates to an auxiliary air system for a gas turbine engine which affords new and improved means for measuring the engine inlet air temperature and for cooling engine components.

2. Description of the Prior Art

The sophistication of gas turbine engines has developed to the utilization of electronic engine controls to supplement, and in some cases replace, hydromechanical engine controls for providing improved safety and higher efficiency of operation. However, an electronic control module is more sensitive to temperature than is a hydromechanical control and therefore requires a greater degree of cooling to maintain its reliability in normal operation and to prolong its useful service life. One manner of keeping the module cool in a gas turbine engine, such as a turbojet engine, is to install it in the nacelle between the engine core, that is, the center of the engine comprising the compressor, combustor and turbine, and the engine cowling, that is, the external, metallic covering of the engine, where the temperature is lower than it is within the engine core. On a turbofan engine, the module can be installed in the annular airspace within the nacelle between the fan casing and the cowling where, because this portion of the nacelle is spaced away from the engine core, the temperature is lower than it is immediately adjacent the core. However, the temperature in the nacelle of any gas turbine engine is still too warm to enable best, long-life operation unless supplemental cooling is utilized. Such supplemental cooling can be obtained by blowing air across the module, and is most advantageous if the coolest air available is utilized to obtain the greatest amount of cooling. The source of air commonly used for cooling engine components such as an electronics module is air bled from the initial stages of the compressor of a gas turbine engine, or, in a turbofan engine, fan air from behind the fan. The air from each of these sources has pressure increased by the compressor or fan, and is thus warmer and consequently a less desirable source of cooling air than is the unpressurized outside air surrounding the engine nacelle. Further, utilization of air from such sources is detrimental to the overall powerplant efficiency. Thus, the most efficient cooling medium is the outside air that enters or passes by the nacelle. Further, the ultimate purpose is to cool the electronic components within the module, not to cool the total environment around the module. Thus, cooling systems which simply pass air around the outside of the module are not the most effective means to achieve maximum life and reliability of the electronic components.

Other engine accessories must also be cooled to operate properly. Further, the compartment which contains the accessory gearbox and its associated components and lines for handling flammable fluids must be properly ventilated to protect against the accumulation of combustible vapors. As indicated above, compressed air from a source within the engine has a higher temperature than the air surrounding the nacelle and is therefore not as efficient for cooling as is the outside air. Additionally, if ram air, that is, the air which is forced into the engine as the aircraft moves through the air, is utilized for cooling and ventilating, there is no flow of air when the aircraft is stationary on the ground.

Another important function in the efficient operation of a gas turbine involves the determination of engine inlet air temperature. The thrust developed by a gas turbine engine and the engine control settings are dependent in part upon the temperature of the air entering the engine. Consequently, this inlet air temperature must be measured to adjust the fuel flow into the engine for obtaining the desired thrust. Inlet air temperature sensors are commonly located at positions on the engine nacelle upstream of the engine compressor, and upstream of the fan in the case of a turbofan engine, such that the sensors are directly exposed to the engine inlet airstream. However, this placement can result in inaccurate readings or even loss of temperature measuring capability. For example, the sensors may accumulate an ice coating at some atmospheric conditions, or they may experience foreign object damage from bird strikes or earth particles impinging upon the sensors. An even more serious difficulty may arise if the sensors are located on the inner surface of the engine inlet cowl. If a sensor, or part of one breaks off, as could occur, for example, during a bird strike, the loose piece would be ingested by the fan or compressor and could cause serious damage or even lead to engine failure.

In view of the cooling problem discussed above, a primary object of the present invention is therefore to utilize the cooling efficiency of air from outside the engine nacelle for cooling engine components located within the nacelle.

Another object of the present invention is to provide a new and improved means for measuring inlet air temperature which removes the sensors from ahead of the engine inlet and places them in a protected air passage within the engine cowling.

SUMMARY OF THE INVENTION

The present invention, in accordance with one embodiment thereof, comprises an auxiliary air system for a gas turbine engine into which system air from the region external to the engine nacelle is inducted for temperature measurement and cooling functions.

The components of the system are located within the engine nacelle between the engine core and the engine cowling, and when the system is used on a turbofan engine such components are located in the annular airspace within the nacelle between the fan cowl and fan casing. The components include: an air ducting pipe, the outer end of which is connected to a cowling at an aperture in the cowling and the inner end of which is connected to a structure to be cooled, such as an electronics module; environmental sensors, such as temperature sensors, to measure the condition of air within the pipe; a structure to be cooled, which may preferably include a heat transfer chamber, through which air from the pipe passes for the purpose of cooling; an air flow device, preferably in the form of a jet pump utilizing pressurized air from another part of the engine as a motivating means, in communication with the structure to be cooled to move air from the region outside the nacelle through the pipe and structure and to the air flow device; and if so desired, air exiting the inducer can be directed onto selected components of the engine for cooling.

BRIEF DESCRIPTION OF THE DRAWING

This invention will be better understood from the following description taken in conjunction with the accompanying drawing and its scope will be pointed out in the appended claims.

DESCRIPTION OF THE PREFERRED EMBODIMENT

Figure 1:
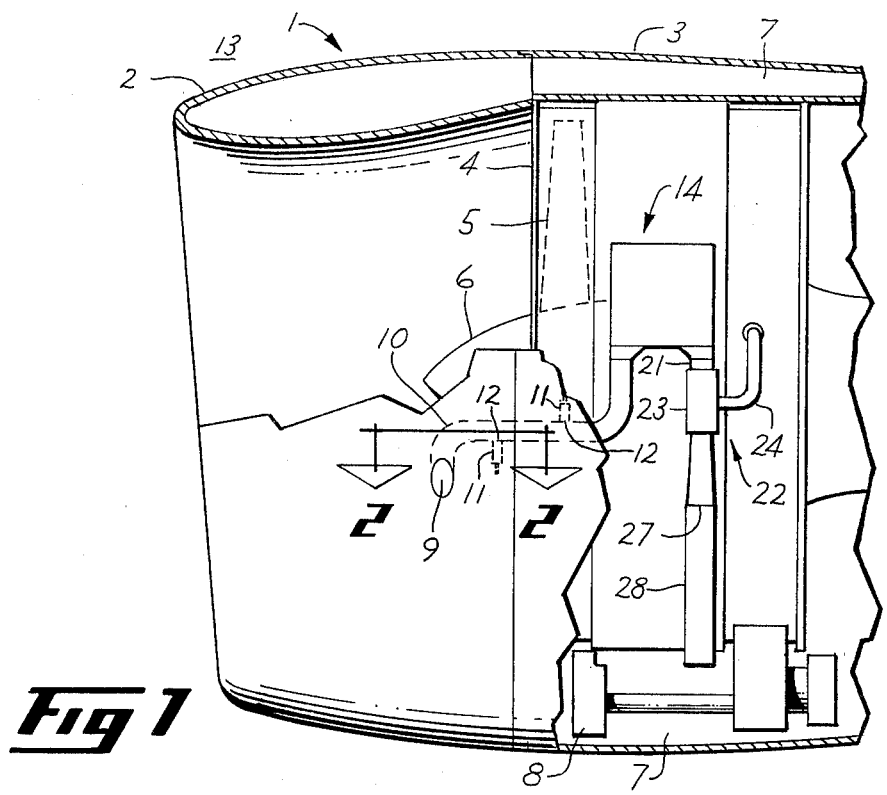
FIG. 1 is a cross-sectional view of the front portion of a nacelle showing a side view of the enclosed turbofan engine and incorporating an embodiment of the present invention.

Referring now to FIG. 1, there is shown the front portion of a nacelle 1 enclosing a gas turbine engine. The particular type of gas turbine shown is a turbofan. However, as discussed above, the invention is adaptable to other types of gas turbines as well.

The forward portion of the nacelle 1 is defined by an inlet cowl 2 and a fan cowl 3. Located radially inwardly from the fan cowl 3 is the fan casing 4. The fan casing 4 is generally annular and surrounds the components of the fan assembly, including the fan rotor 5 (shown in phantom) and a spinner 6. Located within the nacelle 1 and between the fan cowl 3 and the fan casing 4 is an annular airspace 7. The annular airspace 7 is a substantially hollow annular region and is thus a suitable location for mounting various engine components such as the engine driven accessories 8, which include, for example, a starter, hydraulic pumps, and a lubrication scavenge pump.

Figure 2:
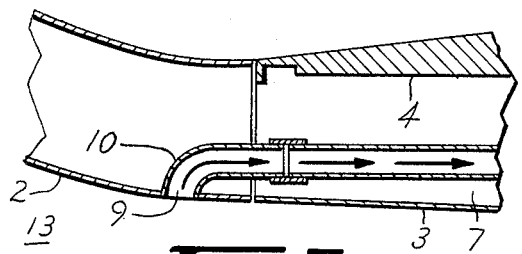
FIG. 2 is a fragmentary cross-sectional view of the inlet end of an air ducting pipe in the presently disclosed system joined to the inlet cowl taken along line 2—2 of FIG. 1 and looking in the direction of the arrows. An alternate method of obtaining outside air is shown in FIG. 2A, using a kiss-seal that mates with the fan cowl door.
Figure 2A:
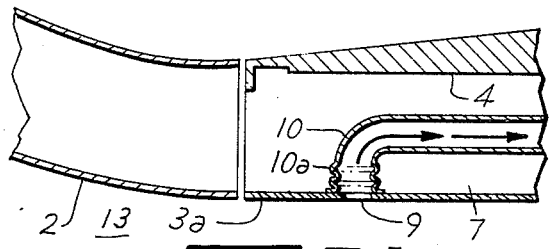

As shown in FIGS. 1 and 2, the external surface of the inlet cowl 2 includes an aperture 9. The aperture 9 is preferably located below the center line of the engine, resulting in the plane of its opening facing below the horizontal, such that rain and snow cannot accumulate therein. Joined to the external surface of the cowl 2 at the aperture 9 is an air ducting pipe 10. The pipe 10 passes from the inlet cowl 2 into the annular airspace 7. An alternative arrangement for the aperture 9 and the air ducting pipe 10 is shown in FIG. 2A. When the fan cowl 3 is hinged and opens to provide access to engine components, it is termed a fan cowl door 3a. In the configuration shown in FIG. 2A, the aperture 9 is located on the external surface of the fan cowl door 3a. Since the pipe 10 remains stationary when the fan cowl door 3a is opened, a flexible seal, known as a "kiss seal" 10a, is connected to the end of the pipe 10 to insure proper alignment of the end of the pipe to the aperture 9 when the door is closed.

Within the annular airspace 7, environmental sensors, such as temperature sensors 11, are preferably mounted on and extend through apertures 12 into the pipe 10 to sense environmental conditions, such as the temperature of the air, therein. Since the temperature of the air in external region 13, just outside the aperture 9, is the same as that of the air upstream of the engine inlet, measurement of the temperature of region 13 air, which is induced into the pipe 10 by means to be described shortly, will be effectively the same as measuring inlet air temperature. Appropriate means (not shown) are employed to transmit the information gained by the sensors to other parts of the engine which are controlled in response to inlet air temperature.

Figure 3:
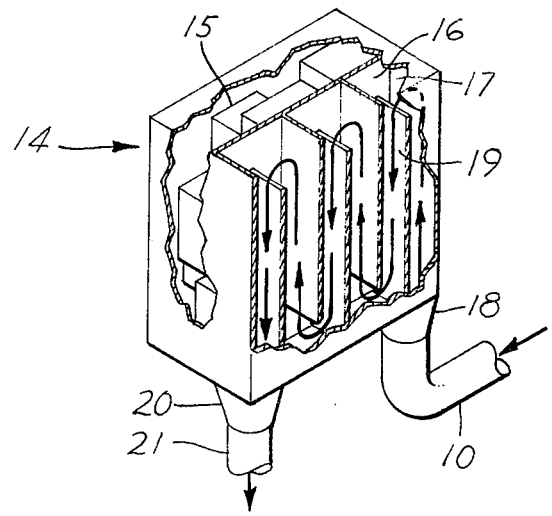
FIG. 3 is an isometric illustration of an electronics module having wall sections broken away to show electronic components therein and a heat transfer chamber comprising parts of the present system.

The pipe 10 conveys cooling air to an engine component, such as an electronics module 14, located in the annular airspace 7, and preferably is connected to heat transfer means comprising part of the component. A particular example of such a component is shown in FIGS. 1 and 3 as an electronics module 14. Electronic components 15 within the module 14 are mounted on a base plate 16. The opposite surface of the base plate 16 is exposed to a heat transfer chamber 17. When the electronic components 15 become warm during operation, the heat is conductively transferred to the base plate 16, which is constructed of a material of high conductive capabilities such as a metal. The base plate 16 in turn conducts heat to air entering the chamber 17 through an aperture 18 from the pipe 10. Fins 19 or other area-increasing devices are provided on the base plate 16 to increase thermal conduction efficiency.

Air exits the chamber 17 through an aperture 20 into a pipe 21. The air continues to flow through the pipe 21 to an air flow device, such as an air flow inducer 22. The inducer 22 may be any type of air pump capable of causing air at region 13 to be induced into the pipe 10 through the aperture 9.

Figure 4:
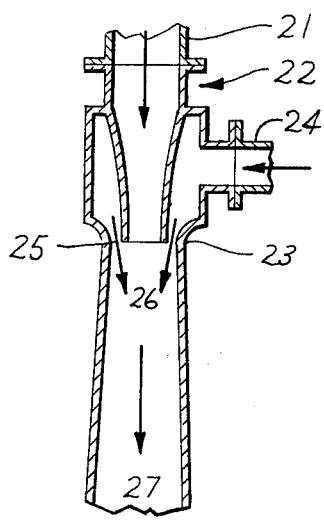
FIG. 4 is a side cross-sectional view of a representative type of jet pump included in the cooling system.

An example of an effective air pump is shown in FIGS. 1 and 4 as a jet pump 23. Pressurized air to operate the pump 23 is tapped from the engine. The source of this pressurized air may, for example, be fan air taken downstream of the fan rotor in a turbofan engine or air from an intermediate stage of a compressor in any gas turbine engine. Such pressurized air, which acts as an operating fluid for the jet pump 23, flows from its source through air pipe 24 and is injected within the pump 23 through a nozzle 25. The injected flow of such pressurized air creates a pressure at area 26 lower than the pressure at region 13 outside the inlet cowl 2, thus inducing air at region 13 to flow through the pipe 10 toward the pump 23.

The air flowing through the pipes 10 and 21 and the pressurized air flowing through the pipe 24 are combined within the pump 23. The combined air flow exits the pump 23 through an outlet 27 and, if desired, can be directed by ducting means such as a pipe 28 to cool selected components of the engine and ventilate the annular airspace 7 within the nacelle 1.

Located in the annular airspace 7 and cooled by the air from the ducting pipe 26 are various engine components including, for example, the above-mentioned engine-driven accessories 8.

The air flow inducer 22 can be a jet pump of various configurations, located downstream of the heat exchanger chamber 17, attached to the chamber, or incorporated within the chamber.

This invention is not to be limited to the particular embodiment disclosed, and is intended to cover all modifications coming within the true spirit and scope of this invention as claimed.

What is claimed is:

1. An auxiliary air system contained within the engine nacelle between the engine core and the engine cowling of a gas turbine engine and comprising:
   (a) an air ducting pipe having one end communicating with an aperture in an external surface of said engine cowling, said aperture lying in a plane generally parallel to the airstream adjacent said aperture;
   (b) at least one environmental sensor arranged to sense the condition of air within said pipe;
   (c) a structure to be cooled connected to the other end of said air ducting pipe;
   (d) an air flow device in communication with said structure to be cooled and effective to move air from the exterior of said cowling through said structure to be cooled, and to said air flow device; and
   (e) means for directing air from said air flow device onto selected other engine components.

2. An auxiliary air system according to claim 1, wherein said means for directing air from said air flow device onto selected other engine components comprises a second ducting pipe.

3. An auxiliary air system contained within the engine nacelle between the fan cowl and the fan casing of a turbofan engine comprising:
   (a) an air ducting pipe having one end communicating with an aperture in a surface of the engine cowling, said aperture lying in a plane generally parallel to the airstream adjacent said aperture;
   (b) at least one environmental sensor arranged to sense the condition of air within said pipe;
   (c) a structure to be cooled including a heat transfer chamber therein connected to the other end of said air ducting pipe;
   (d) an air flow device in communication with said heat transfer chamber and effective to move air from the exterior of said cowling, through said structure to be cooled, and to said air flow device; and
   (e) a second ducting pipe for directing air from said air flow device onto selected other engine components.

4. An auxiliary air system according to claim 3 wherein the portion of said engine cowling in which said aperture is disposed is positionable relative to said air ducting pipe and wherein the end of said air ducting pipe communicating with said aperture includes a flexible seal for, in at least one position of said engine cowling, aligning said air ducting pipe with said aperture.

* * * * *